US005153687A

United States Patent [19]
Ishikawa et al.

[11] Patent Number: 5,153,687
[45] Date of Patent: Oct. 6, 1992

[54] SEMICONDUCTOR OPTICAL FUNCTIONAL DEVICE WITH PARABOLIC WELLS

[75] Inventors: Takuya Ishikawa; Shinji Nishimura, both of Tokyo; Kunio Tada, Urawa, all of Japan

[73] Assignees: Furukawa Electric Co., Ltd., Tokyo; Tada Kunio, Saitama, both of Japan

[21] Appl. No.: 726,572

[22] Filed: Jul. 8, 1991

[30] Foreign Application Priority Data

Jan. 10, 1991 [JP] Japan .................................. 3-1469

[51] Int. Cl.$^5$ .............................................. H01L 27/14
[52] U.S. Cl. ........................................ 357/30; 357/16; 357/4; 357/19; 359/248; 359/252; 359/282
[58] Field of Search ............... 357/4, 30 E, 30 R, 16, 357/19, 90; 359/245, 246, 248, 251, 252, 282, 283, 284

[56] References Cited

U.S. PATENT DOCUMENTS 4,716,449 12/1987 Miller ................................. 357/30 E
4,778,235 10/1988 Fujiwara ........................ 357/30 E X

FOREIGN PATENT DOCUMENTS 54-98587 8/1979 Japan ................................. 357/30 E

OTHER PUBLICATIONS

Miller et al., vol. 29, No. 6, Mar. 15, 1984, pp. 3740–3743, Phys. Rev. B, "Parabolic Quantum Wells with the GaAs-Al$_x$Ga$_{1-x}$As System".

Primary Examiner—William Mintel
Attorney, Agent, or Firm—Frishauf, Holtz, Goodman & Woodward

[57] ABSTRACT

An optical switch comprises a substrate, a lower cladding layer, a waveguide layer, and an upper cladding layer each formed of a semiconductor, and in which at least one of the three layers except the substrate has a quantum well structure at a quantum confined potential. The well plane of the quantum well structure is symmetrical with respect to the center position thereof, and varies in proportion to the square of the distance from the center position. If an electric field is applied perpendicular to the well plane, the respective changes in the absorption coefficient and refractive index in the vicinity of the absorption edge are influenced by absorption peak shifts attributable to both 1e-1hh and 1e-11h transitions. Thus, the optical switch operates in response to both TE and TM mode light without depending on polarization.

5 Claims, 3 Drawing Sheets

SEMICONDUCTOR OPTICAL FUNCTIONAL DEVICE WITH PARABOLIC WELLS

BACKGROUND OF THE INVENTION

The present invention relates to a semiconductor optical functional device, and more particularly, to a semiconductor optical functional device adapted for use as a polarization-independent optical switch which can operate in response to both TE and TM mode light. There have recently been proposed semiconductor optical switches in which waveguide layers, for example, are formed having a quantum well structure for improved performance.

In general, this quantum well structure is formed by stacking a plurality of rectangular potential quantum wells for use as fundamental units. Each quantum well is composed of a thin semiconductor with a thickness substantially equal to the de Brogilie wavelength of electrons, which is inserted between the two semiconductors whose band gap energy are greater than that of the thin semiconductor.

In the quantum well as the fundamental unit hereinafter referred to as single quantum well), the inserted semiconductor and the holding semiconductors form a steplike quantum confined potential, which discontinues at the interface planes between the semiconductor and the holding semiconductors.

In the quantum well structure, the energy levels for electrons and holes are quantized, and the electrons and holes are confined within a very thin region. Even at room temperature, therefore, clear sharp light absorption peak is manifested due to the production of excitons which are each formed of an electron and a hole in a binding state.

If an electric field is applied perpendicular to the quantum well plane moreover, the position of the excitonic absorption peak is shifted to the longer wavelength side without broadening its sharp peak, which is called the quantum confined Stark effect. In the quantum well structure, appear a great change in absorption coefficient and a subsequent change in refractive index for the light of wavelengths in the vicinity of the absorption edge.

Accordingly, the light absorption in the semiconductor can be increased or decreased by applying the electric field perpendicular to the well plane, for the light with wavelengths between the absorption wavelengths before (shorter) and after (longer) the application of the electric field. Thus, switching operation can be performed.

In the rectangular quantum well structure described above, degeneracy in the energy levels of heavy and light holes, which is characteristic of bulk semiconductors, is eliminated, and the quantization energy levels for the individual holes separately exist. In the aforementioned excitonic absorption at the absorption edge, therefore, an absorption peak corresponding to an exciton formation from a ground-level electron and a ground-level heavy hole (hereinafter referred to as 1e-1hh transition) develops on the longer wavelength side, while an absorption peak corresponding to an exciton formation from a ground-level electron and a ground-level light hole (hereinafter referred to as 1e-1lh transition) develops on the shorter wavelength side.

If an electric field is applied perpendicular to the quantum well plane in this state, the absorption peak corresponding to the 1e-1hh transition greatly shifts to the longer wavelength side, while the absorption peak corresponding to the 1e-1lh transition which is originally situated on the shorter wavelength side, much less shifts to the longer wavelength side.

Since the energy shift attributable to the quantum confined Stark effect is substantially proportional to the effective mass of a particle associated with the transition, the shift in excitonic absorption energy corresponding to the 1e-1hh transition, which includes a heavy hole with a mass heavier than light hole, is large.

Accordingly, the changes in the absorption coefficient and refractive index in the vicinity of the absorption edge practically depend on the excitonic absorption corresponding to the 1e-1h transition. Therefore, the switching operation using light with wavelengths near absorption edge is regulated by the excitonic absorption corresponding to the 1e-1hh transition.

The 1e-1lh transition interacts with both a light having a component whole photoelectric field is parallel to the quantum well plane (hereinafter referred to as TE mode light) and a light having a component whose photoelectric field is perpendicular to the quantum well plane (hereinafter referred to as TM mode light). On the other hand, the 1e-1hh transition interacts only with the TE mode light, and not with the TM mode light.

As mentioned before, however, the switching operation accompanying the application of the electric field can be enabled by the excitonic absorption corresponding to the 1e-1hh transition.

Accordingly, the conventional optical switches with the rectangular quantum well structure cannot easily operate for the TM mode light, although they can satisfactorily operate for the TE mode light. Thus, the switching operation is dependent on polarization, and the TM mode light cannot be easily modulated.

SUMMARY OF THE INVENTION

An object of the present invention is to provide a semiconductor optical functional device whose switching characteristics are not dependent on polarization.

Another object of the invention is to provide a semiconductor optical switch which is small-sized, exhibits a high extinction ratio, and can operate at low voltage.

In order to achieve the above objects, according to the present invention, there is provided a semiconductor optical functional device which comprises a substrate, a lower cladding layer, a waveguide layer, and an upper cladding layer each formed of a semiconductor and stacked in the order named, upper and lower electrodes being mounted on the upper surface of the upper cladding layer and the lower surface of the substrate, respectively. In this device, at least one of the lower cladding layer, the waveguide layer, and the upper cladding layer has a single or multiple quantum well structure. The quantum confined potential of each individual quantum well which constitutes the quantum well structure is symmetrical with respect to the center position of the well plane of the quantum well, and varies in proportion to the square of the distance from the center position.

DETAILED DESCRIPTION

In an optical functional device according to the present invention, as in a conventional one, a substrate, a lower cladding layer, a waveguide layer (core layer), and an upper cladding layer are each formed of a semiconductor, and upper and lower electrodes for electric field application are mounted on the upper surface of the upper cladding layer and the lower surface of the substrate, respectively.

The optical functional device of the invention is characterized, however, in that at least one of the lower cladding layer, waveguide layer, and upper cladding layer has a quantum well structure for quantum confined potential, which will be mentioned later.

Figure 1:
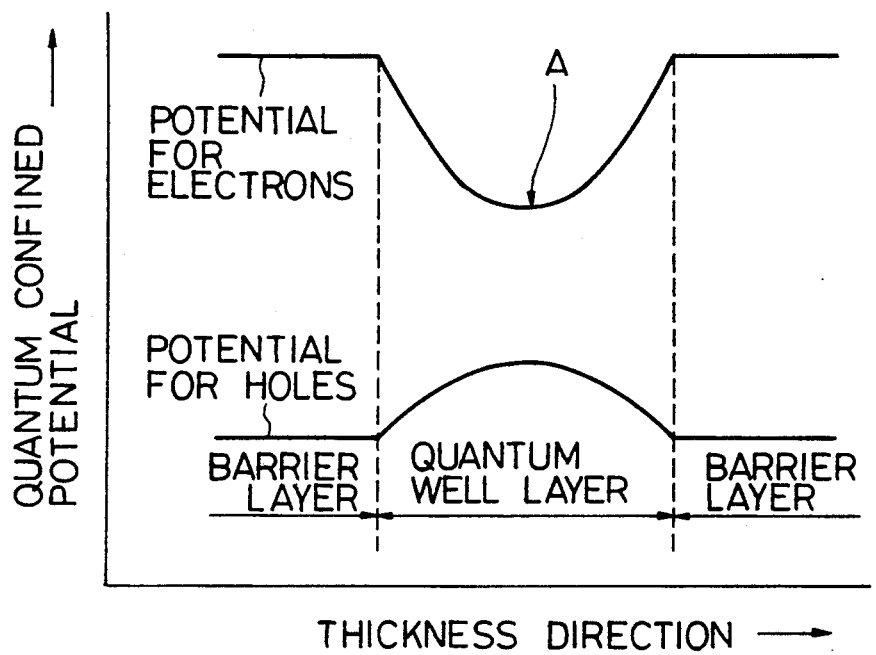
FIG. 1 is a profile showing the relationship between the thickness of a quantum well of a mixed-crystal semiconductor formed in an optical functional device according to the present invention and the quantum confined potential.

The quantum well structure is designed so that the respective quantum confined potentials of individual quantum wells, which constitute the structure, are symmetrical with respect to the center position A of the quantum well plane, as viewed in the thickness direction, and vary in proportion to the square of the distance from the center position A in the thickness direction, that is, in curves of second degree, as shown in FIG. 1.

The following is a description of method for forming a single quantum well having the aforesaid quantum confined potential, in which GaAs and $Al_xGa_{1-x}As$ are used as semiconductors.

In a first method, after a semiconductor barrier layer of e.g. Al0.3Ga0.7As (X=0.3) is formed, mixed-crystal semiconductors whose Al crystal mixture ratios gradually decrease are successively stacked for lamination on the barrier layer so that the quantum confined potential of the mixed crystal semiconductor layers in stacking is reduced in a curve of second degree, and only GaAs (X=0) is stacked for lamination at the center position A of the well plane. Then, mixed crystal semiconductors whose Al crystal mixture ratios gradually increase are successively stacked for lamination so that the quantum confined potential increases in a curve of second degree. Finally, a barrier layer of $Al_{0.3}Ga_{0.7}As$ (X=0.3) is stacked again on the resulting structure.

Practically, however, it is very difficult to gradually vary the crystal mixture ratios of the mixed-crystal semiconductors to form a quantum confined potential in a curve of second degree.

Actually, therefore, it is advisable to form the single quantum well so that its quantum confined potential profile is equivalent curves of second degree, by varying the thickness and period of a so-called short-period superlattice column.

This type of the aforesaid single quantum well structure is proposed and described in Phys. Rev. B29 (1984) P3740 by R. C. Miller et al. According to this proposal, $Al_xGa_{1-x}As$ and GaAs are alternately stacked so that $Al_xGa_{1-x}As$ layers ($0 \leq X \leq 1$) with a thickness $[(n-0.5)/N]^2 LZ/2N$ are placed at a distance $(N-0.5)LZ/2N$ from the center position of the well plane of the single quantum well structure, and the remaining material is GaAs, where Lz, N and n are the thickness of the well structure, the desired number (positive integer) of short-period superlattice column barriers and positive integer with $n \leq N$, respectively. The quantum confined potential profiles of the resulting structure are equivalent curves of second degree.

Figure 2:
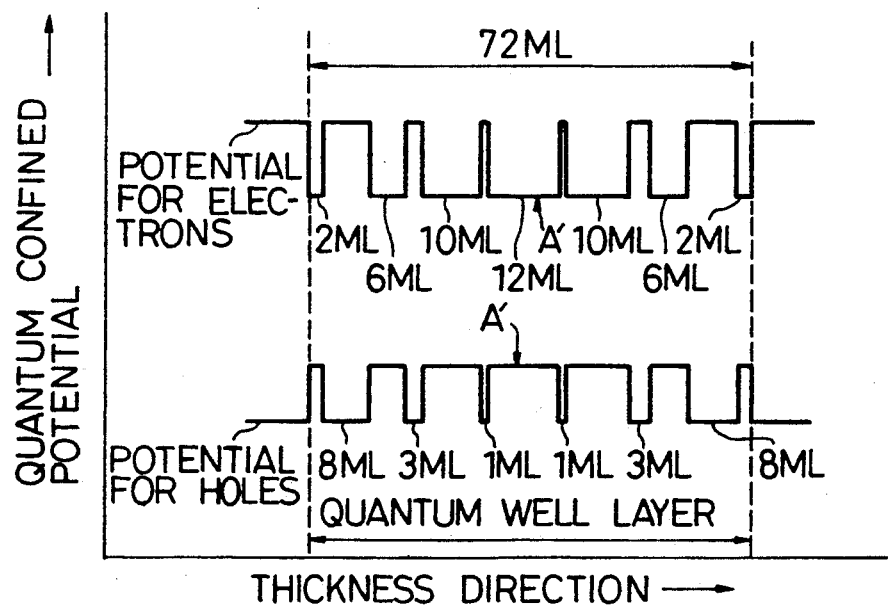
FIG. 2 is a diagram showing an arrangement of a quantum well of the invention composed of a short-period superlattice column of Al0.aGa0.7As/GaAs.

FIG. 2 shows an example of a single quantum well structure which is composed of a short period superlattice column of $Al_{0.3}Ga_{0.7}As$/GaAs, and whose quantum confined potential profiles are equivalent curves of second degree. In FIG. 2, ML is a unit indicative of the thickness (2.83 angstroms) of one molecular layer of GaAs or $Al_{0.3}Ga_{0.7}As$.

If the number N used in the method proposed by Miller et al. is too large, then the semiconductor layers situated close to the center position of the well place will have to be made thinner than a monolayer. In the short-period superlattice column structure of FIG. 2, therefore, N=3 is used. As for X, it is 0.3.

The single quantum well structure of FIG. 2 is a laminate structure with an overall thickness of 72ML formed by successively stacking a GaAs layer of 2ML, $Al_{0.3}Ga_{0.7}As$ layer of 8ML, GaAs layer of 6ML, $Al_{0.3}Ga_{0.7}As$ layer of 3ML, GaAs layer of 10ML, $Al_{0.3}Ga_{0.7}As$ layer of 1ML, GaAs layer of 12ML, $Al_{0.3}Ga_{0.7}As$ layer of 1ML, GaAs layer of 10ML, $Al_{0.3}Ga_{0.7}As$ layer of 3ML, GaAs layer of 6ML, $Al_{0.3}Ga_{0.7}As$ layer of 8ML, and GaAs layer of 2ML on an $Al_{0.3}Ga_{0.7}As$ barrier layer of about 30 to 40ML, and further stacking an $Al_{0.3}Ga_{0.7}As$ barrier layer of about 30 to 40ML on the last GaAs layer of 2ML. All these layers are formed by the MBE (molecular beam epitaxy) method. Alternatively, they may be formed by the MOCVD (metal-organic chemical vapor deposition) method.

The quantum confined potential of this short-period superlattice column structure is symmetrical with respect to a center position A' at a distance corresponding to a thickness of 36ML from the barrier layers, and varies in an approximate curve of second degree.

If an electric field is applied perpendicular to the well plane of a single quantum well whose quantum confined potential varies in a curve of second degree symmetrical with respect to the center position of the quantum well plane, the energy shift corresponding to the 1e-1hh transition is substantially equal to the one corresponding to the 1e-1lh transition. The reason is that if the electric field is applied to the quantum well whose quantum confined potential is varying in a curve of second degree, the potential still varies in a curve of second degree, although the center position is displaced, so that both heavy and light holes confined in the single quantum well are sensible of the potential varying in a curve of second degree. Thus, the symmetry of the de Brogilie wave is maintained, and the energy shift becomes independent on the effective mass of the holes. Since the energy shifts corresponding to the 1e-1hh and 1e-1lh transition are substantially equal, the respective changes of the absorption coefficient and refractive index in the vicinity of the absorption peak of the 1e-1lh transition, as well by that of the absorption peak of the 1e-1hh transition.

Since the 1e-11h transition interacts with both TE and TM mode light, the changes in the absorption coefficient and refractive index at the fundamental absorption edge of the quantum well structure can take place also for the TM mode light, so that their polarization dependence is lower than in the case of a conventional rectangular quantum well structure.

Accordingly, the changes in the absorption coefficient and refractive index can be made independent on polarization by suitably selecting the aforementioned quantum confined potential profiled in the curve of second degree and the operation wavelength.

Since the device according to the present invention has the quantum well structure, moreover, it can be driven at low voltage with a high extinction ratio, and its configuration can be compact.

The quantum well structure of the optical functional device of the invention may alternatively be a multiple quantum well structure which is formed cyclically stacking single quantum well structures with barrier layers between them.

The optical functional device of the invention may be used in an optical switch, light modulator, wave synthesizer/splitter, etc.

EXAMPLE

A lower cladding layer of n-type $Al_{0.3}Ga_{0.7}As$ was formed on an n+-type GaAs substrate. Then, a waveguide layer of a multiple quantum well structure was formed by depositing single quantum wells of the structure shown in FIG. 2 on this lower cladding layer for 17 cycles, with use of $Al_{0.3}Ga_{0.7}As$ barrier layers of 35Ml thickness between the each single quantum well structures. Further, an upper cladding layer of p-type $Al_{0.3}Ga_{0.7}As$ was formed on the waveguide layer. Thereafter, upper and lower electrodes were mounted on The upper surface of the upper cladding layer and the lower side of the substrate, respectively, thereby forming the optical functional device according to the present invention.

An electric field was applied between the upper and lower electrodes, and the relationship between the excitonic absorption peak energy of the device at a temperature of 80K and the applied electric field was examined. A device with a waveguide layer formed having the conventional rectangular quantum well structure was fabricated as a comparative example. The rectangular quantum well structure was obtained by stacking GaAs layers of 44ML thickness for 25 cycles with use of $Al_{0.3}Ga_{0.7}As$ barrier layers of 20ML thickness between the stacked layers. This comparative example was also examined for the aforesaid relationship.

Figure 3:
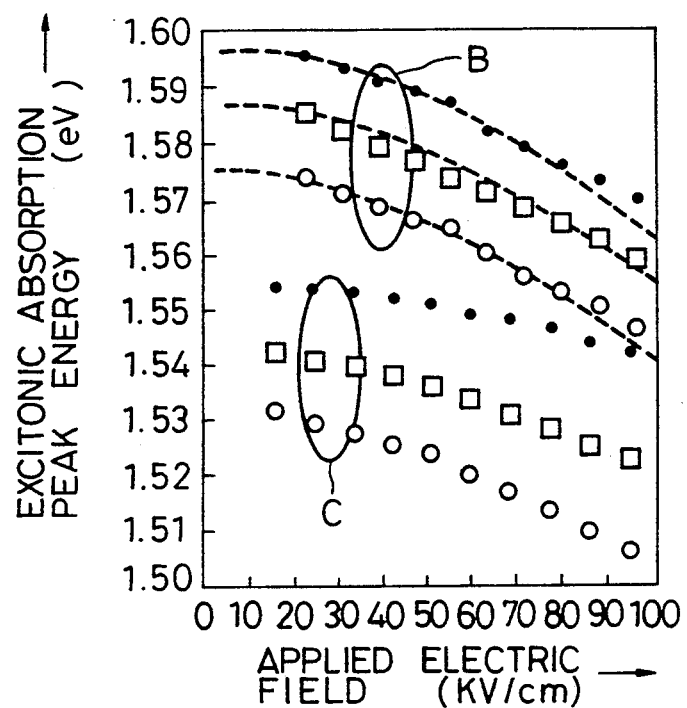
FIG. 3 is a graph showing the relationship between the excitonic absorption peak energy of the optical functional device of the invention and the applied electric field.

FIG. 3 shows the result of this examination. In FIG. 3, groups B and C represent the device of the present invention and the device of the comparative example, respectively. Circles, squares, and black spots indicate excitonic absorption energies corresponding to a 1e-1hh transition, 1e-11h transition, and 1e-2hh transition, respectively.

As seen from FIG. 3, the respective shifts of the 1e-11h and 1e-1hh transitions are substantially equal in the quantum well structure of the device of the present invention, whereas the shift of the 1e-11h transition is smaller than that of the 1e-1hh transition in the quantum well structure of the device of the comparative example.

Figure 4:
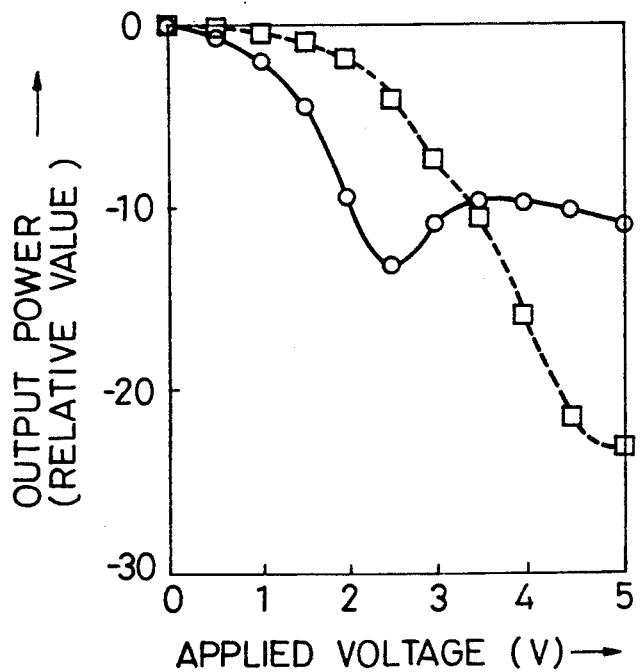
FIG. 4 is a graph showing the relationship between the output power of the optical functional device of the invention and the applied voltage.

Subsequently, the above-described device of the present invention was used to fabricate a planar waveguide-type optical switch whose waveguide layer is 448 μm long, a voltage was applied between the upper and lower electrodes, and the changes of output powers obtained with use of the TE and TM mode light whose wavelengths were 844 nm were examined. FIG. 4 shows the result of this examination. In FIG. 4, circles and squares indicate the cases of the TE and TM mode light, respectively.

As seen from FIG. 4, both the TE and TM mode light are switched at an extinction ratio of about 10 dB by applying a voltage of 3.5 V.

In the case of the aforementioned optical switch with the conventional rectangular quantum well structure, the wavelengths of available light beams are shifted to the longer wavelength side, and switching characteristics for the TE and TM mode light cannot develop even though a voltage of 10 V or more is applied.

Figure 5:
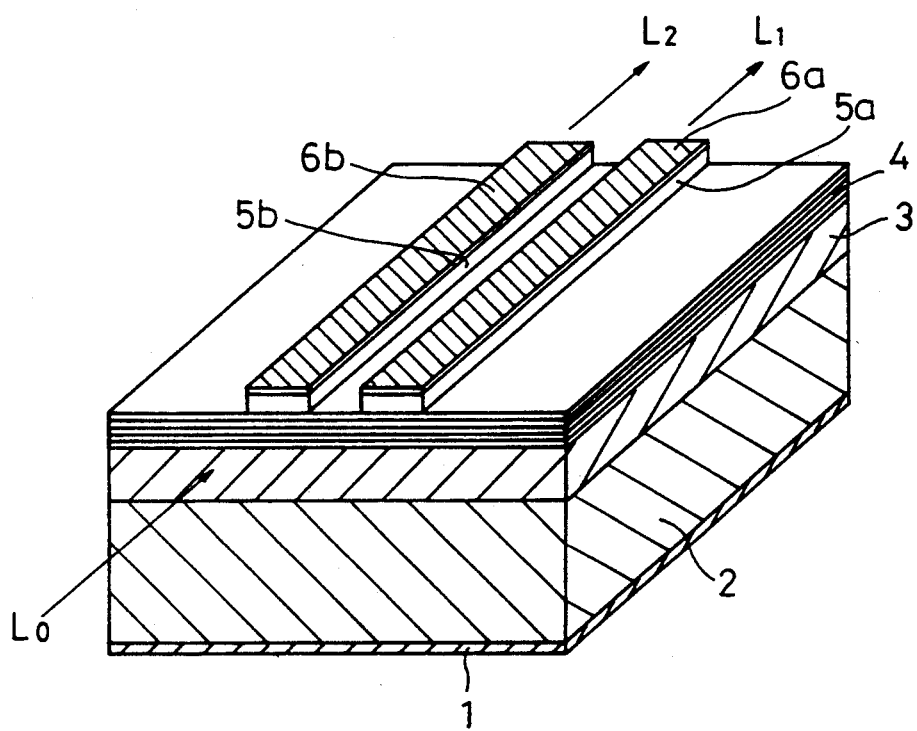
FIG. 5 is a perspective view of a polarization-independent, directional coupler-type optical switch having the quantum well structure of the invention.

FIG. 5 is a perspective view showing a directional coupler-type optical switch having the device structure of the present invention.

In FIG. 5, a lower cladding layer 3 of n-type $Al_{0.3}Ga_{0.7}As$ is formed on an n+-type GaAs substrate 2, and a waveguide layer 4 is formed by stacking single quantum wells of the structure shown in FIG. 2 on the cladding layer 3 for 17 cycles, with use of $Al_{0.3}Ga_{0.7}As$ barrier layers of 35ML thickness between the stacked single quantum well structure layers. Further, two upper cladding layers 5a and 5b of p-type $Al_{0.3}Ga_{0.7}As$ are formed on the waveguide layer 4 by forming the evanescent coupling. Upper electrodes 6a and 6b are mounted on the upper surfaces of the layers 5a and 5b, respectively, and a lower electrode 1 is mounted on the underside of the substrate 2.

In the case of this optical switch, if a light beam which combines the Te and TM mode light beams is incident upon one of the waveguides, as indicated by arrow $L_o$, it is coupled to the other waveguide, and emerges therefrom as indicated by arrow $L_2$.

Hereupon, a voltage of a predetermined value is applied between the upper electrode 6a and the lower electrode 1. In the quantum well structure of that portion of the waveguide layer 4 which underlies the electrode 6a, equal energy shifts occur corresponding to the 1e-1hh and 1e-11h transitions, and the refractive index of the waveguide layer 4 lowers for both the TE and TM mode light. Accordingly, the evanescent coupling between the waveguides is cut off, so that the incident light beam ($L_o$) combining the TE and TM mode light beams emerges as indicated by arrow $L_2$ in FIG. 5. Thus, the optical path changes its course from $L_1$ to $L_2$, whereupon an optical switching operation is performed without depending on polarization.

What is claimed is:

1. A semiconductor optical switch device comprising a substrate, a lower cladding layer, a waveguide layer, and an upper cladding layer each formed of a semiconductor and stacked in the order named, upper and lower electrodes mounted on the upper surface of said upper cladding layer and the lower surface of said substrate, respectively, wherein:

at least one of said lower cladding layer, said waveguide layer, and said upper cladding layer is formed of at least one layer having a single quantum well structure with a well plane at a quantum confined potential; and said well plane of said quantum well structure is symmetrical with respect to the center position thereof, 2. A semiconductor optical switch device according to claim 1, wherein at least one of said lower cladding layer, said waveguide layer, and said upper cladding layer includes a multiple quantum well structure formed by cyclically stacking a plurality of layers each having said single quantum well structure with barrier layers between the stacked single quantum well structure layers, at the quantum confined potential.

3. A semiconductor optical switch device according to claim 1, wherein said single quantum well structure is a short-period superlattice column structure formed by alternately stacking $Al_xGa_{1-x}As$ and GaAs so that $Al_xGa_{1-x}As$ layers ($0 \leq X \leq 1$) with a thickness $[(n-0.5)/N]^2 LZ/2N$ are placed at a distance $(n-0.5)LZ/2N$ from the center position of the well lane of the single quantum well structure, and the remaining material is GaAs, where LZ, N and n are the thickness of the well structure, the desired number (positive integer) of short-period superlattice column barriers and a positive integer with $n \leq N$, respectively. and varies in proportion to the square of the distance from the center position.

4. A semiconductor optical switch device according to claim 1, wherein said single quantum well thickness of 72ML formed by successively stacking a GaAs layer of 2ML, $Al_{0.3}Ga_{0.7}As$ layer of 8ML, GaAs layer of 6ML, $Al_{0.3}Ga_{0.7}As$ layer of 3ML, GaAs layer of 10ML, $Al_{0.3}Ga_{0.7}As$ layer of 1ML, GaAs layer of 12ML, $Al_{0.3}Ga_{0.7}As$ layer of 1ML, GaAs layer of 10ML, $Al_{0.3}Ga_{0.7}As$ layer of 3ML, GaAs layer of 6ML, $Al_{0.3}Ga_{0.7}As$ layer of 8ML, and GaAs layer of 2ML, where ML is a unit indicative of the thickness of one molecular layer of GaAS.

5. A semiconductor optical switch device according to claim 1, wherein said single quantum well structure is a laminate structure with an overall thickness of 72ML formed by successively stacking a GaAs layer of 2ML, $Al_{0.3}Ga_{0.7}As$ layer of 8ML, GaAs layer of 6ML, $Al_{0.3}Ga_{0.7}As$ layer of 3ML, GaAs layer of 10ML, $Al_{0.3}Ga_{0.7}As$ layer of 1ML, GaAs layer of 12ML, $Al_{0.3}Ga_{0.7}As$ layer of 1Ml, GaAs layer of 10ML, $Al_{0.3}Ga_{0.7}As$ layer of 3ML, GaAs layer of 6ML, $Al_{0.3}Ga_{0.7}AS$ layer of 8ML, and GaAs layer of 2ML, where ML is a unit indicative of the thickness of one molecular layer of $Al_{0.3}Ga_{0.7}As$.

* * * * *